March 7, 1950  V. R. MATTINGLY ET AL  2,499,662

PUMP PISTON

Filed Nov. 10, 1947

Inventor
Virdean R. Mattingly.
George C. Mallory

By

E. V. Hardway.
Attorney

Patented Mar. 7, 1950

2,499,662

UNITED STATES PATENT OFFICE 2,499,662

PUMP PISTON

Virdean R. Mattingly, Houston, Tex., and George C. Mallory, New Iberia, La.

Application November 10, 1947, Serial No. 785,160

5 Claims. (Cl. 309—17)

This invention relates to a pump piston.

An object of the invention is to provide a piston assembly of the character described whereby a fluid tight seal will be formed between the spindle of the piston rod and the piston body.

The piston herein described has been primarily designed for use in slush pumps used for pumping gritty fluids such as drilling fluid used in drilling wells and for other similar purposes.

In pumping gritty fluids if a leak occurs between the piston and the piston rod the gritty fluid under high pressure will soon cut out the adjacent parts and injure or destroy the piston.

It is another object of the present invention to provide a piston of the character described wherein a permanent leak proof seal is provided between the piston body and the piston rod.

Other objects and advantages will be apparent from the following specification which is illustrated by the accompanying drawings, wherein.

Figure 1:
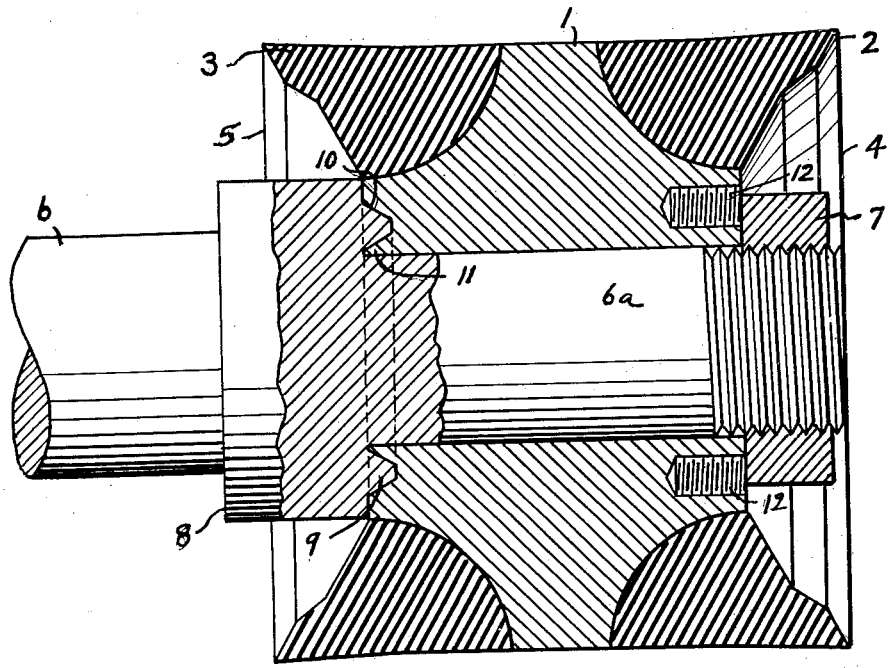
Figure 1 is a longitudinal, sectional view of the piston.
Figure 2:
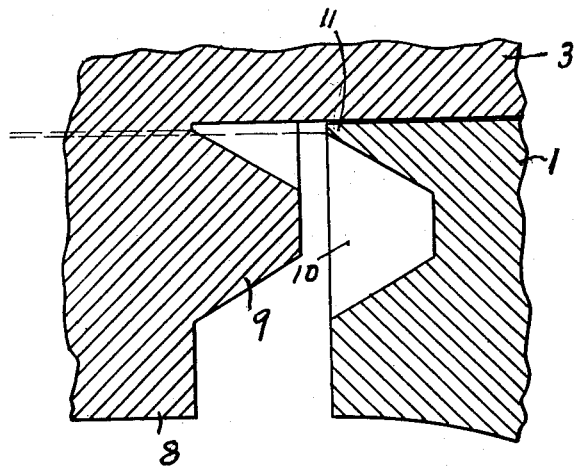
Figure 2 is a fragmentary, sectional view shown in the process of assembly.

Referring now more particularly to the drawings wherein like numerals of reference designate similar parts in each of the figures, the numeral 1 designates a piston body which is formed of suitable metal and is of a general cylindrical contour so as to conform to the liner of the pump cylinder.

Around the ends of the piston body are the packing rings 2, 3. These rings are formed of suitable resilient material and may be of any selected design and secured to the body in any preferred manner. They terminate in oppositely directed flared lips 4 and 5 which follow the contour of the pump liner in which the piston works.

The numeral 6 designates the piston rod whose end is reduced in diameter forming the spindle 6a which is cylindrical in shape and fits axially through the piston body 1 with its end externally threaded to receive the clamp nut 7 which is threaded thereon and abuts the forward end of the piston body.

Formed integrally with the piston rod 6 adjacent the other end of the piston body there is an enlarged relatively wide rib 8 whose inner side abuts the end of the piston body 1 and has an annular V-shaped rib 9 extending therearound. The sloping faces of this rib 9 should be ground smooth.

The adjacent end of the piston body 1 is formed with an annular groove 10 which is of substantially the same contour as the V-shaped rib 9. The faces of the groove are preferably ground smooth. An annular lip 11 is thus formed around the inner margin of the groove 10.

The groove 10 is slightly narrower in width than the thickness of the rib 9 so that when the piston is assembled on the spindle 6a and the nut 7 screwed home the rib 9 will be seated in the groove 10 and the lip 11 will be contracted very tightly around the spindle 6a so as to form a fluid tight joint between said lip and spindle. The sides of the rib 9 will also form fluid tight seals with the corresponding sides of the groove 10 so that a triple seal will be formed to prevent any leakage between the piston body 1 and the spindle 6a.

The outer end of the piston body 1 is provided with threaded sockets, as 12, so that when the nut 7 is removed pulling tools may be engaged in the sockets 12 and the piston body 1 thus pulled from the spindle 6a.

The drawings and description are illustrative merely while the broad principle of the invention will be defined by the appended claims.

What we claim is:

1. A piston and rod assembly comprising, a piston body having an annular substantially V-shaped groove in one end thereof, a piston rod extended axially through the body, a substantially V-shaped rib on the rod positioned to fit within said groove, a clamp nut threaded onto the end of the rod to clamp against the other end of the body to seat the rib tightly in the groove to form a fluid tight joint, said rib and groove having ground contacting faces.

2. A piston and rod assembly comprising, a piston body having an annular substantially V-shaped groove in one end thereof, a piston rod extended axially through the body, a substantially V-shaped rib on the rod positioned to fit within said groove, a clamp nut threaded onto the end of the rod to clamp against the other end of the body to seat the rib tightly in the groove to form a fluid tight joint, said rib and groove having ground contacting faces and annular seal rings on the body to fit within the liner of the cylinder in which the piston works.

3. A piston and rod assembly comprising, a substantially cylindrical piston body having an annular, outwardly flared groove in one end, a piston rod having an annular enlargement and an annular rib on the enlargement shaped to fit within said groove, said rod extending axially through the body, a clamp nut threaded onto the rod to abut the other end of the body to draw said rib tightly into the groove when the nut is screwed home to form a fluid tight seal between the rod and body.

4. A piston and rod assembly comprising, an approximately cylindrical piston body having an axial bore therethrough and having an annular outwardly flared groove in one end around and adjacent the bore positioned to form an annular lip around said bore, a piston rod one end of which extends through the bore, an annular rib on the rod shaped to wedge into the groove, a nut threaded onto the rod and adapted to abut the other end of the piston body to draw said rib tightly into the groove when the nut is screwed home, said rib being slightly wider than the groove, radially, to contract said lip tightly around the rod to form a fluid tight joint.

5. A piston and rod assembly comprising, a piston body having an axial bore therethrough and an annular outwardly flared groove in one end around and adjacent the bore positioned to form an annular lip around said bore, a piston rod one end of which extends through the bore, an annular rib on the rod shaped to wedge into the groove, said groove and wedge having ground contacting faces, clamp means on the rod and adapted to abut the other end of the piston to draw said contacting faces closely together to form a fluid tight seal between the rib and groove, said rib being slightly wider, than the groove, radially, to contract said lip tightly around the rod to form a fluid tight joint.

VIRDEAN R. MATTINGLY.
GEORGE CLEON MALLORY.

REFERENCES CITED

The following references are of record in the file of this patent:

UNITED STATES PATENTS

| Number | Name | Date |
|---|---|---|
| 1,073,062 | Alley et al. | Sept. 9, 1913 |
| 1,537,755 | Dowling | May 12, 1925 |
| 1,752,994 | Malloy | Apr. 1, 1930 |
| 2,410,428 | Cronstedt et al. | Nov. 5, 1946 |